US008150741B2

(12) United States Patent
Figueroa et al.

(10) Patent No.: US 8,150,741 B2
(45) Date of Patent: Apr. 3, 2012

(54) SHOPPING ASSISTANT

(75) Inventors: Joseph Figueroa, Kirkland, WA (US);
Mike Hall, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/724,336

(22) Filed: Mar. 15, 2010

(65) Prior Publication Data

US 2011/0225068 A1 Sep. 15, 2011

(51) Int. Cl.
*G06Q 30/00* (2012.01)
(52) U.S. Cl. .................................... 705/26.9; 705/26.1
(58) Field of Classification Search ............... 705/26–27
See application file for complete search history.

(56) References Cited

U.S. PATENT DOCUMENTS

| | | | |
|---|---|---|---|
| 6,317,722 B1 | 11/2001 | Jacobi et al. | |
| 6,411,895 B1 * | 6/2002 | Lau et al. ..................... | 701/209 |
| 7,624,923 B2 | 12/2009 | Clark et al. | |
| 7,720,715 B1 * | 5/2010 | Nemer ........................... | 705/26 |
| 2001/0011235 A1 | 8/2001 | Kim et al. | |
| 2003/0144793 A1 * | 7/2003 | Melaku et al. ................. | 701/209 |
| 2004/0104930 A1 * | 6/2004 | Stoler ............................ | 345/738 |
| 2004/0181456 A1 * | 9/2004 | Matsumori ..................... | 705/26 |
| 2005/0177446 A1 * | 8/2005 | Hoblit ............................ | 705/26 |
| 2006/0059049 A1 | 3/2006 | Morris et al. | |
| 2006/0087474 A1 * | 4/2006 | Do et al. ........................ | 342/386 |
| 2008/0027795 A1 * | 1/2008 | Medlin et al. .................. | 705/14 |
| 2008/0027796 A1 | 1/2008 | Chaves | |
| 2008/0189033 A1 * | 8/2008 | Geelen et al. ................. | 701/209 |
| 2008/0267107 A1 * | 10/2008 | Rosenberg .................... | 370/312 |
| 2008/0312815 A1 * | 12/2008 | Stoler ............................ | 701/200 |
| 2009/0085803 A1 * | 4/2009 | Mergen ..................... | 342/357.07 |
| 2009/0239552 A1 | 9/2009 | Churchill et al. | |
| 2009/0276300 A1 * | 11/2009 | Shaw et al. .................. | 705/14.1 |
| 2010/0045660 A1 * | 2/2010 | Dettinger et al. ............. | 345/419 |
| 2010/0050100 A1 * | 2/2010 | Dettinger et al. ............. | 715/764 |

OTHER PUBLICATIONS

Santos, et al., "IntelligentCart: Architecture of an Innovative System for the Acquisition of Products in Grocery Stores", Retrieved at <<http://www.ibima.org/pub/journals/CIBIMA/volume8/v8n11.pdf>> In the Communications of IBIMA, 2009, vol. 8, No. 11, pp. 80-87.

Stan, et al., "Intelligent Store—An Innovative Technological Solution for Retail Activities with Mobile Access", Retrieved at <<http://ieeexplore.ieee.org/stamp/stamp.jsp?arnumber=04591337>> In the proceedings of third International Multi-Conference on Computing in the Global Information Technology Jul. 27, 2008, pp. 7-11.

"Smart Shopping Carts to Roam Grocery Stores of Future", Retrieved at <<http://www.usatoday.com/news/science/2003-10-26-shop-smart_x.htm>> Oct. 26, 2003, pp. 3.

Garfinkel, et al., "Shopbot 2.0: Integrating Recommendations and Promotions with Comparison Shopping", Retrieved at <<http://papers.ssrn.com/sol3/Delivery.cfm/SSRN_ID958781_code739765.pdf?abstractid=958781&mirid=1>> Dec. 2006, p. 1-28.

"Transforming the In-Store Shopping Experience with Retail Mobility Solutions", Retrieved at <<http://www.motorola.com/staticfiles/Business/Products/Mobile%20Computers/Handheld%20Computers/MC17/_Documents/Static%20Files/MC17-Whitepaper-1208.pdf>> Dec. 2008, pp. 12.

"Cuesol (for Stop & Shop)" Retrieved at <<http://www.filamentgroup.com/portfolio/cuesol_for_stop_shop/>> Jan. 20, 2010, pp. 4.

* cited by examiner

*Primary Examiner* — Adam Levine
*Assistant Examiner* — Ethan D Civan
(74) *Attorney, Agent, or Firm* — Alleman Hall McCoy Russell & Tuttle LLP

(57) ABSTRACT

Various embodiments are disclosed herein that relate to the dynamic calculation and presentation of efficient travel routes for in-person shoppers. For example, an adaptive shopping server system is configured to generate, for display on a shopping client device, an efficient travel route to a location of one or more user-requested merchandise items, the efficient travel route being advantageously distinct relative to other potential travel routes in consideration of a route efficiency selection criterion received from the shopping client device.

20 Claims, 6 Drawing Sheets

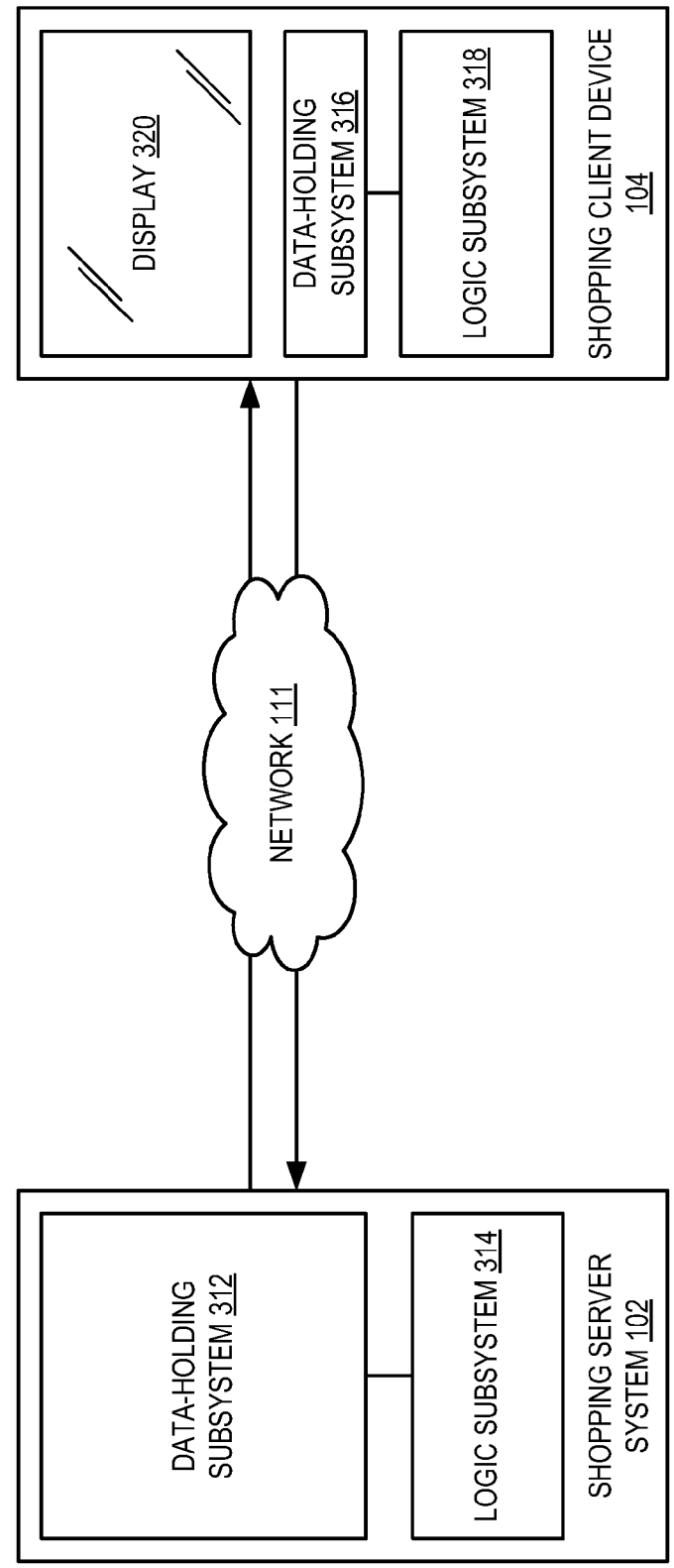

SHOPPING ASSISTANT

BACKGROUND

Neighborhood shopping districts, shopping malls, and stores may retail competing goods at different locations within the district, mall, or store. In some scenarios, in-person shoppers may compare features and/or prices of competing goods before making a purchase. In such scenarios, shoppers may visit more than one retail location prior to making a purchase. It may be difficult for busy shoppers to locate a prospective purchase, travel to a retail location, and make comparisons in a given amount of time.

SUMMARY

Accordingly, various embodiments are disclosed herein that relate to the dynamic calculation and presentation of efficient travel routes for in-person shoppers. For example, an adaptive shopping server system is configured to generate, for display on a shopping client device, an efficient travel route to a location of one or more user-requested merchandise items, the efficient travel route being advantageously distinct relative to other potential travel routes in consideration of a route efficiency selection criterion received from the shopping client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 schematically shows aspects of an example shopping efficiency system.

DETAILED DESCRIPTION

Figure 1:
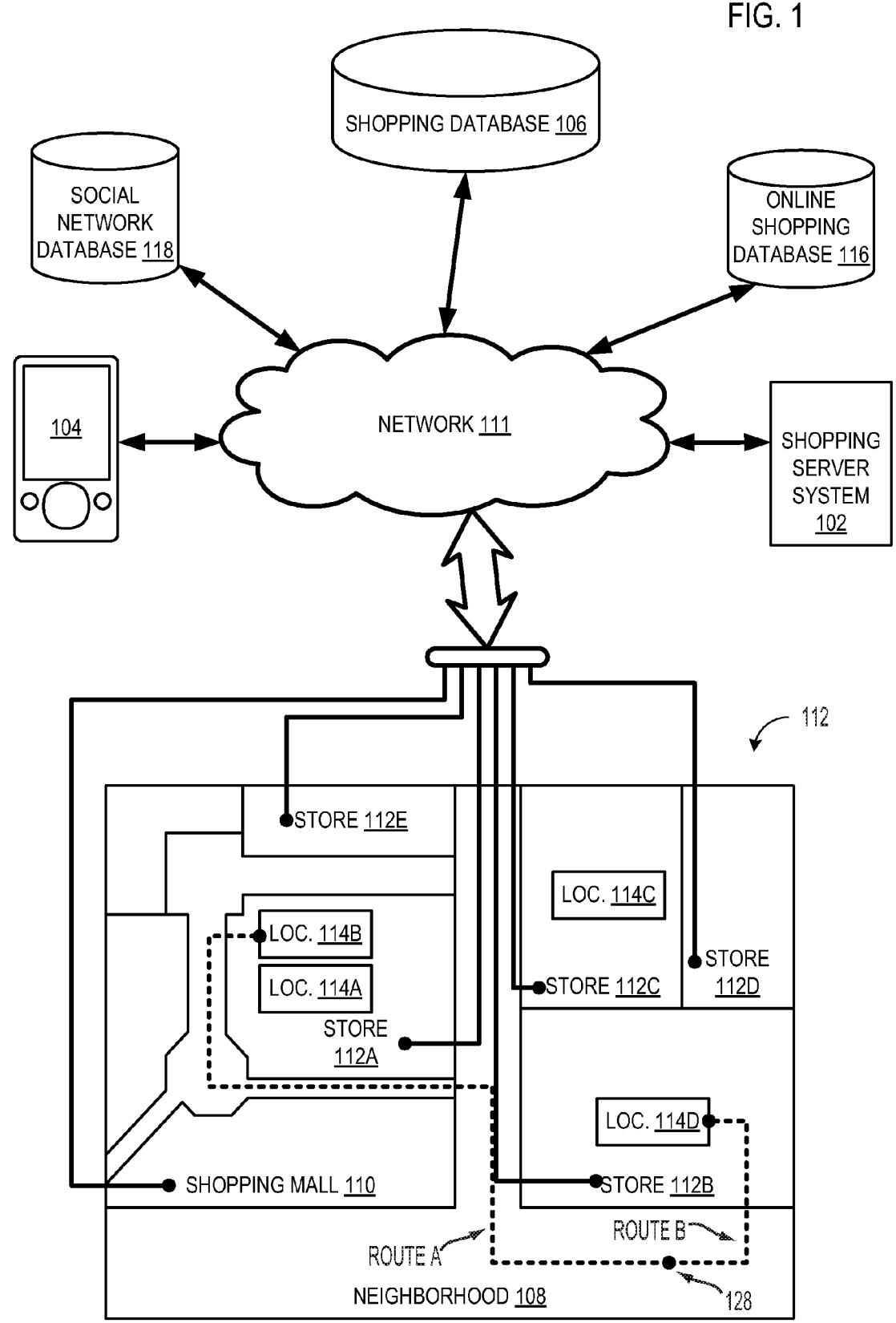
FIG. 1 schematically shows an example shopping efficiency system in accordance with an embodiment of the present disclosure.

FIG. 1 schematically shows an example embodiment of a shopping efficiency system 100. Shopping efficiency system 100 is configured to generate, at a shopping server system 102, an efficient travel route to a location of one or more user-requested merchandise items, and to send the efficient travel route to a shopping client device 104. A shopper may use shopping client device 104 and the efficient travel route to shop for one or more merchandise items according to one or more efficiency criterion, such as time efficiency, distance efficiency, price efficiency, etc. In some embodiments, the efficient travel route may provide a fastest, shortest, cheapest, etc. travel route to obtain one or more requested merchandise items. It will be appreciated that the efficient travel route may traverse any suitable route. For example, in some examples, the travel route may traverse a portion of neighborhood 108, a portion of shopping mall 110, and/or a portion of one or more participating stores 112, according to particular shopping circumstances for each example.

The disclosed embodiments of shopping efficiency system 100 are directed at exposing, in real-time, inventory information for requested merchandise items, facility information for requested merchandise locations, and efficient travel routes to those requested merchandise locations. Such information may be provided by one or more participating merchants and/or merchant locations and stored in shopping database 106 for exposure to shopping client device 104 via network 111 and shopping server system 102.

Some embodiments of shopping efficiency system 100 may utilize a user-configured route efficiency selection criterion. The route efficiency selection criterion may be used as a key for filtering the facility and inventory information when calculating the efficient travel route. In some embodiments, the route efficiency selection criterion may include one or more selection parameters. The selection parameters may comprise a time parameter, a distance parameter, a cost parameter, etc.

For example, in a first scenario, a shopper in a hurry may want the efficient travel route prioritized on a time basis as indicated by a time parameter. Thus, in a scenario where a requested DVD movie is available at locations 114B and 114D, if customer in-line wait times at location 114D are longer than customer in-line wait times at location 114B, a potential travel route including a stop at location 114B may be prioritized over a route including a stop at location 114D.

In a second scenario, a shopper on a budget may want the efficient travel route prioritized on a cost basis. Thus, in a scenario where a requested DVD movie is available at locations 114B and 114D, if the DVD movie is less expensive at location 114B than at location 114D, a potential travel route including a stop at location 114B may be prioritized over a route including a stop at location 114D.

In a third scenario, a shopper may want to reduce a distance traveled while shopping. Thus, consider a scenario where a requested DVD movie is available at locations 114B and 114D. In this scenario, Route A, originating at current location 128 and including a stop at location 114B, is depicted as a longer potential travel route in FIG. 1, while route B, originating at current location 128 and including a stop at location 114D, is depicted as a shorter potential travel route. Thus, route B may be prioritized over route A in this scenario.

Thus, various embodiments of shopping efficiency system 100 are configured to provision shopping database 106 with facility and inventory information for one or more merchandise locations. Shopping server system 102 is configured to receive a request for a requested merchandise item from shopping client device 104; to calculate the efficient travel route originating at a current location 128 of shopping client device 104 and including a stop at a selected requested merchandise location identified within shopping database 106 from one of a plurality of possible merchandise locations having the requested merchandise item; and to send the efficient travel route to shopping client device 104 for display.

Figure 2:
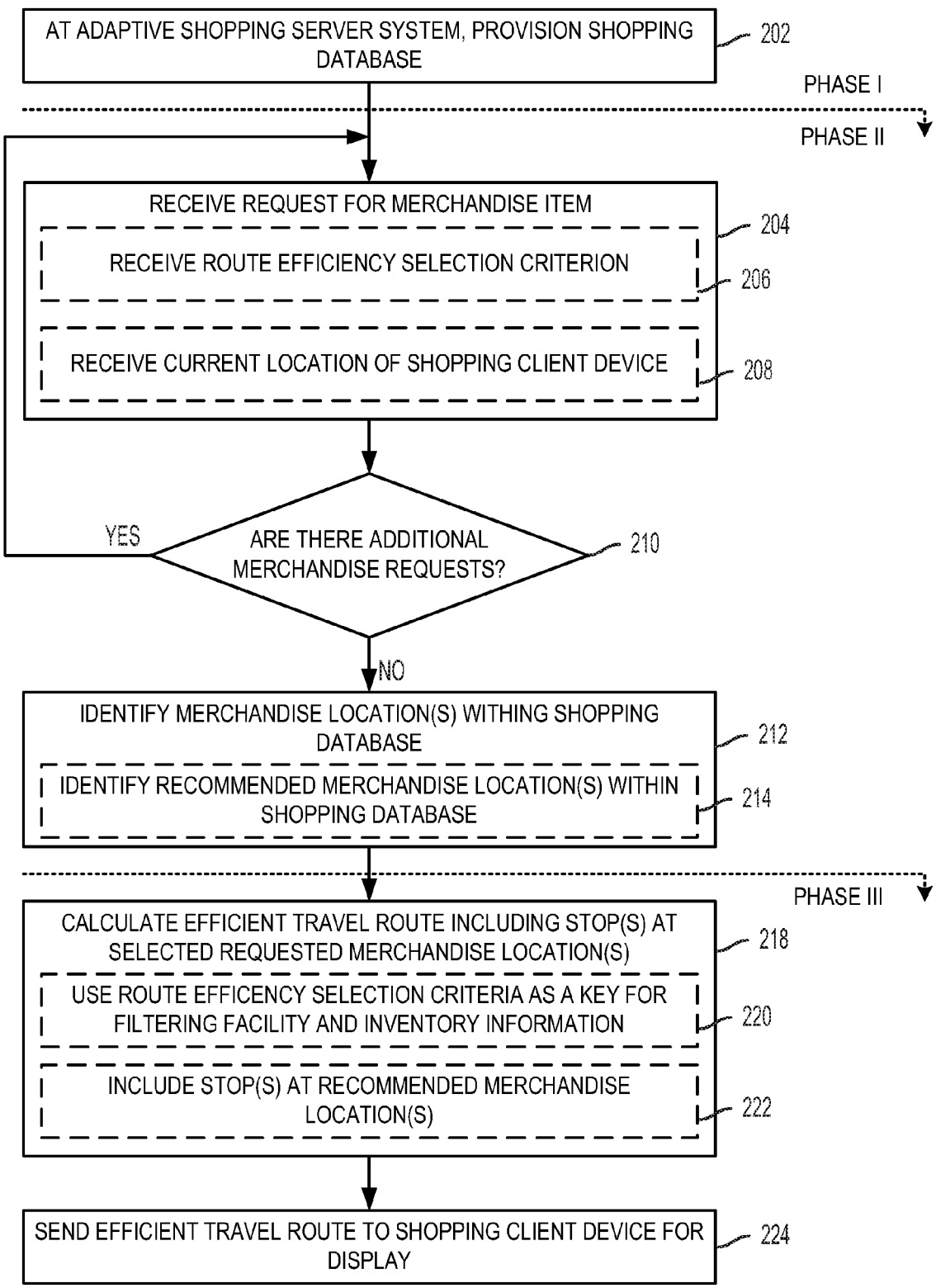
FIG. 2 shows an example method for generating an efficient travel route in accordance with an embodiment of the present disclosure.

FIG. 2 shows an example method 200 for generating an efficient travel route in accordance with an embodiment of the present disclosure. Method 200 may be implemented using the hardware and software components described above in relation to FIG. 1 and below in relation to FIG. 6 or via other suitable hardware and software components. Thus, while FIG. 2 refers to a shopping client device and a shopping server system, it will be appreciated that other embodiments of method 200 may be performed using other suitable hardware and/or other suitable networks. Furthermore, various embodiments of method 200 may utilize any suitable communication protocols, data structures, schemas, and/or other mechanisms that facilitate the generation and delivery of efficient travel routes to a shopping client device.

For illustrative purposes, method 200 may be divided into three phases. In a first phase, a shopping server system is configured to provision a shopping database with facility and inventory information for one or more merchandise locations. In a second phase, the shopping server system is configured to receive, from the shopping client device, a request for a merchandise item. In a third phase, the shopping server system is configured to calculate an efficient travel route and send it to the shopping client device for display. The details of each phase are described in detail below, though it will be appreciated that tasks may be organized into other suitable phases and other suitable orders of tasks may be employed in other embodiments.

At step 202, method 200 comprises, at the shopping server system, provisioning the shopping database with the facility and inventory information for one or more merchandise locations. Inventory information may include any suitable information about merchandise in a participating merchant's inventory. In some embodiments, the inventory information may include an identity of a merchandise item, which may be determined, in some embodiments, from a universal product code (UPC) associated with the item. Similarly, some embodiments of inventory information may include a price for the merchandise item, a location for the merchandise item within a merchant's showroom or stockroom, a quantity of a particular merchandise item in stock, etc. Such example inventory information may be provided, in some embodiments, via an interface with a participating merchant's internal stock keeping system or via interface with a suitable point-of-sale data aggregator. Thus, in one example, three participating stores 112A, 112B, and 112C may upload information about price, location, and availability for a DVD title stocked at three merchandise locations 114B, 114C, and 114D to the shopping database.

Facility information is configured to include any suitable information about a facility where the merchandise may be located. In some embodiments, the facility information may include the locations of one or more infrastructure features (e.g., parking lots, stairs, elevators, restrooms, etc.), geographic points-of-interest (e.g., food courts, meeting places, transit stops, etc.), and the like. Further, the facility information may include path information, such as mall or neighborhood maps including path segments for those maps, as well as metadata for the path information, such as average travel times for a path segment, crowd densities along a path segment, etc. Further still, the facility information may include data about the infrastructure features (e.g., parking availability within the parking lots, whether an elevator is closed for repair, etc.). Additionally or alternatively, in some embodiments, the facility information may include information about a merchant's showroom (e.g., how many check stands are open, how long customers wait in line at those check stands, etc.).

It will be appreciated that the facility and inventory information may be monitored, aggregated, and tracked by any suitable method, and that various embodiments of method 200 may employ, for example, radio frequency identification (RFID) tags, sensors, point-of-sale data aggregators, etc. to generate the information dynamically for real-time provisioning of the shopping database.

In some embodiments, the shopping database may be provisioned with facility and inventory information pushed to the shopping database by one or more participating merchants and/or merchant facilities. For example, in a first scenario, a shopping mall 110 may send to the shopping database 106 a number of available parking spots at shopping mall 110 and a location for each available spot as the spots are occupied or vacated. In a second scenario, one or more participating stores 112 may upload to shopping database 106, on a continuing basis, customer in-line wait times for a check stand derived from transaction frequency measurements and/or frequency of identification of an RFID tag attached to the merchandise being checked out at the check stand.

Additionally or alternatively, in some embodiments, the shopping database may be configured to poll participating merchants and merchant facilities for updated facility and inventory information, pulling the facility and inventory information into the shopping database. Thus, in one scenario, shopping database 106 may request inventory figures from one or more participating stores 112 at preset intervals so that shopping database 106 has current inventory information for that merchant.

Figure 3:
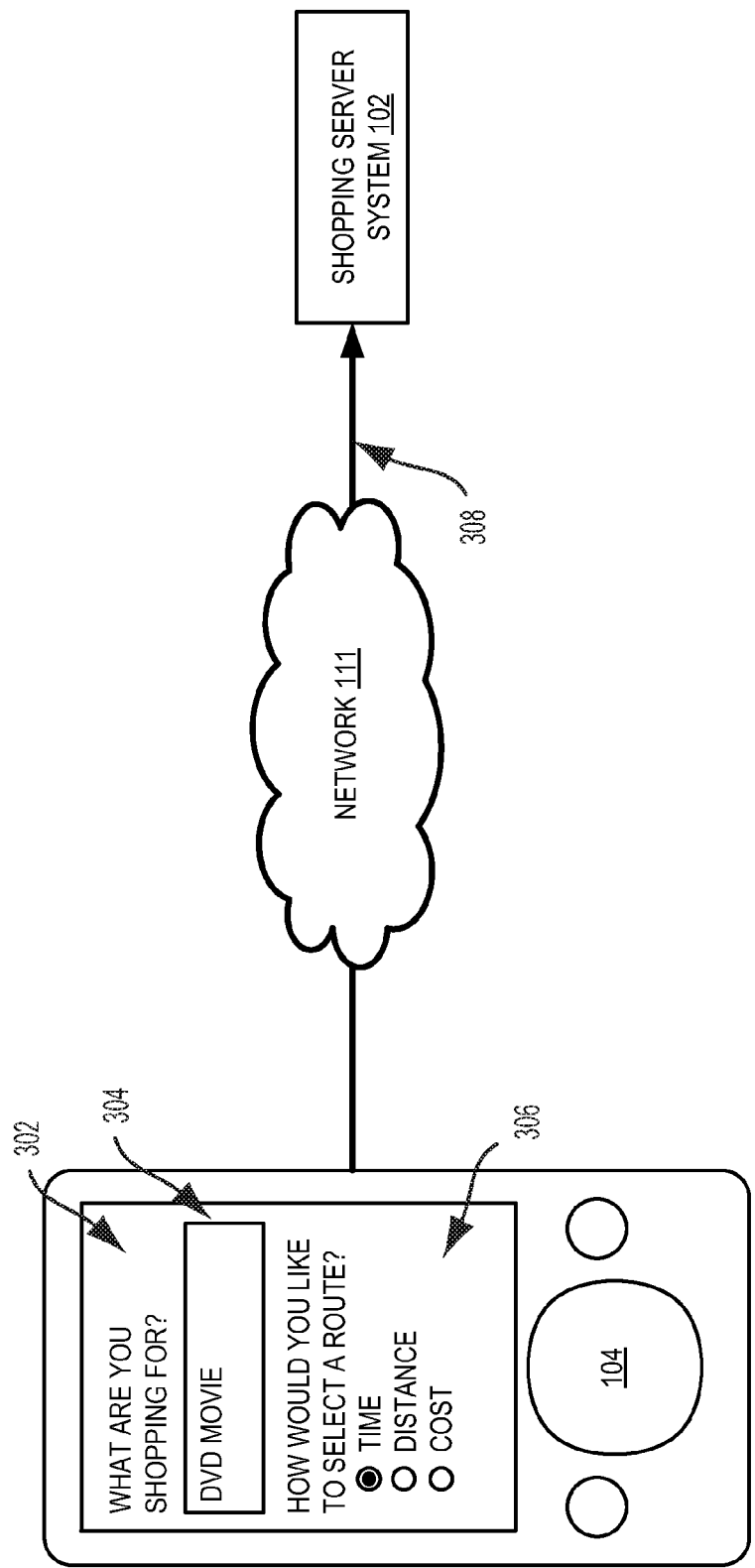
FIG. 3 schematically shows aspects of an example shopping efficiency system.

Continuing with FIG. 2, method 200 comprises, at 204, receiving a request for a first merchandise item from the shopping client device. For example, FIG. 3 schematically shows an embodiment of shopping client device 104 having a user interface 302. User interface 302 includes a merchandise request interface 304 and a selection parameter interface 306. Merchandise request interface 304 is configured to receive user input text descriptions of one or more requested merchandise items. For example, as depicted in FIG. 3, a shopper has input "DVD MOVIE" into merchandise request interface 304, which will be sent to shopping server system 102 via message 308 transmitted via network 111.

In some embodiments, step 204 of method 200 may include, at 206, receiving a route efficiency selection criterion from the shopping client device. The route efficiency selection criterion may be a user-specified criterion used by the shopping server system as a key for filtering facility and inventory information when calculating the efficient travel route. In some embodiments, the route efficiency selection criterion may include a selection parameter. Example selection parameters may include a time parameter, a distance parameter, a cost parameter, etc. A selection parameter may be specified by a user via the shopping client device.

In the example depicted in FIG. 3, a shopper has specified a "time" selection parameter via selection parameter interface 306. The selected parameter may be transmitted to shopping server system 102. Example scenarios employing various embodiments of the route efficiency selection criterion and selection parameters are described in detail below with respect to FIGS. 4 and 5.

It will be appreciated that, in some embodiments, a plurality of selection parameters may be included in route efficiency selection criterion, the plurality of selection parameters including at least two of a time parameter, distance parameter, or cost parameter. Accordingly, in one example, a user may choose to prioritize time and cost and may choose to deprioritize distance when specifying a plurality of selection parameters. Further, it will be appreciated that in some embodiments a single selection parameter may be specified and that, in some embodiments, a user-configured selection parameter may be employed. For example, a user may create and configure selection parameters specified to prioritize kid-friendly travel routes, disabled-friendly travel routes, etc.

Continuing with FIG. 2, in some embodiments, step 204 may include, at 208, receiving a current location of the shopping client device from the shopping client device. For example, shopping client device 104 may include current location 128 in a request for a requested merchandise item sent to shopping server system 102. The current location may be determined in any suitable manner. For example, in some embodiments, global positioning system (GPS) or other device tracking architecture included in the shopping client device may provide current location information. Alternatively or additionally, in some embodiments, a user may supply current location information via entry into user interface 302.

At step 210, method 200 allows a user to provide additional merchandise requests. When additional merchandise requests are provided, the method returns to step 204; if no additional merchandise requests are provided, the method continues to step 212. Thus, it will be appreciated that a second requested merchandise item, a third requested merchandise item, etc., may optionally be received from the shopping client device in some scenarios. It will be appreciated that identification of merchandise locations for a requested merchandise item may be performed for each requested merchandise item. Thus, if a user requests a second, third, etc. merchandise item, the shopping server system may be configured to identify merchandise locations for the second, third, etc. requested merchandise items, and provide an efficient travel route with stops for all requested merchandise items.

Figure 4:
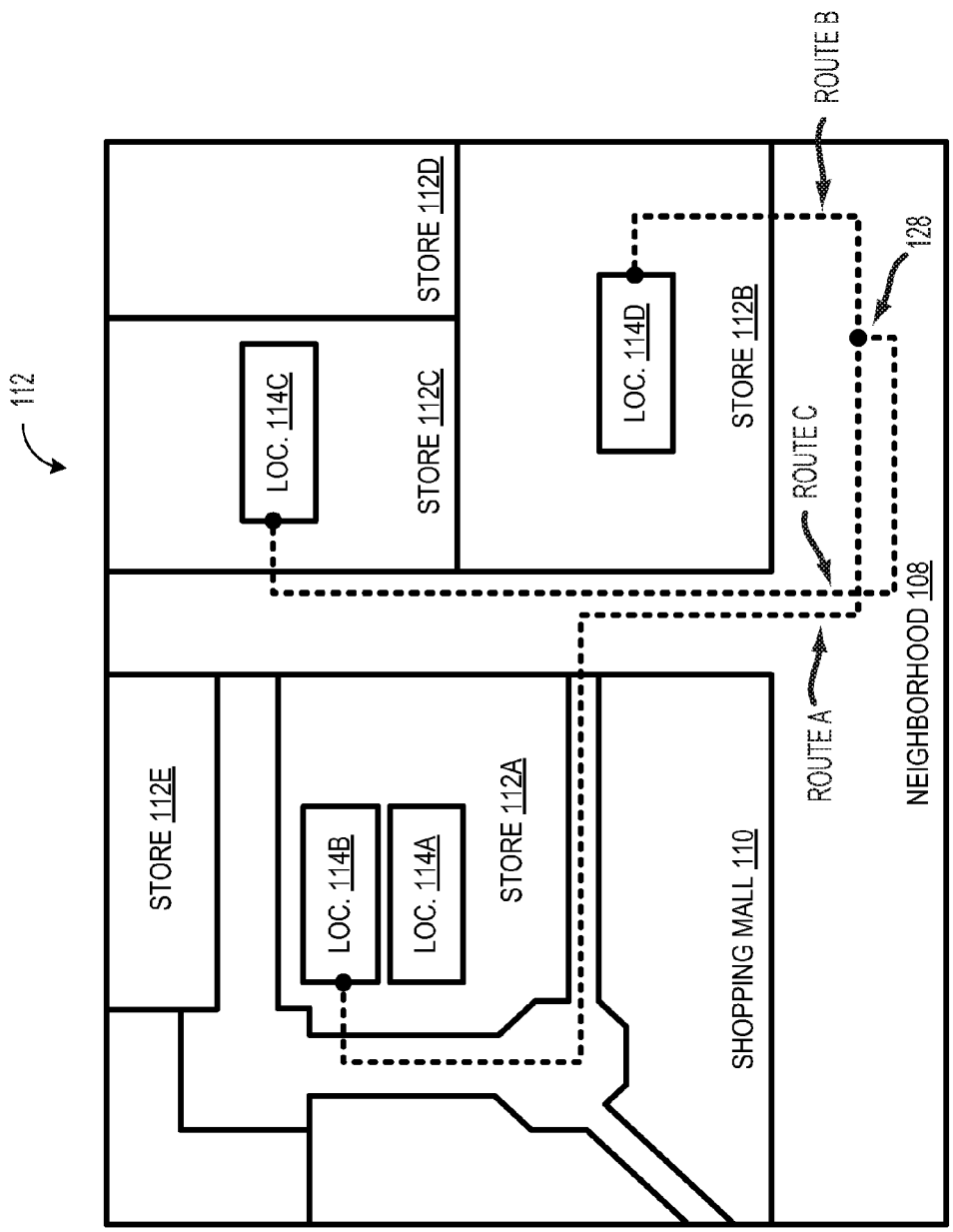
FIG. 4 schematically shows aspects of an example shopping efficiency system.

At step 212, method 200 includes identifying within the shopping database a first merchandise location for the first merchandise item. In some embodiments, the shopping server system may be configured to look up, from a table of location information included in the facility and inventory information of the shopping database, identification and location information for the requested merchandise item. For example, if a shopper inputs a DVD title into the shopping client device, the shopping server system may look up corresponding merchandise location information. FIG. 4 schematically illustrates a portion of an example shopping database 106 including location information for DVD and BLU-RAY movie titles; for example, location 114B has one copy of a requested movie title in DVD format and one copy of the movie title in BLU-RAY format. Additionally or alternatively, some embodiments may employ one or more suitable search techniques or search engines to identify the merchandise location information for the requested merchandise items. Further, it will be appreciated that, in some embodiments, a store may have a plurality of possible merchandise locations for the requested merchandise item. For example, locations 114A and 114B of store 112A may correspond, respectively, to a retail showroom and an inventory closeout showroom of store 112A, wherein each location may contain a copy of a requested DVD title.

In some embodiments, the shopping server system may be configured to verify that two or more merchandise items at different merchandise locations are the same. For example, the shopping server system may discriminate between a theatrical release version of DVD movie available at one location and a "director's cut" version of the same title available at another location. Further, in some embodiments, the shopping client device may be configured to receive user specification of what constitutes an acceptably comparable merchandise item. For example, FIG. 4 depicts a portion of shopping database 106 and a map for a neighborhood 108 including one or more participating stores 112 and shopping mall 110 that participate in shopping efficiency system 100 and provide facility and inventory information to shopping database 106. In one scenario, user specification that both DVD and BLU-RAY formats for a movie title are acceptable may result in the shopping server system identifying locations 114A, 114B, 114C, and 114D as locations having one or both formats of the movie title. In a second scenario, user specification that the DVD format alone is acceptable may result in the shopping server identifying locations 114B, 114C, and 114D as having DVD versions.

In some embodiments, step 212 may include, at 214, identifying within the shopping database a recommended merchandise location for a recommended merchandise item identified within the shopping database. A recommended merchandise item is a merchandise item recommended to a user of the shopping client device based on other merchandise items the user has requested and/or has purchased. In some embodiments, once a recommended merchandise item is identified, the recommended merchandise location identification may proceed similarly to the above-described identification of the requested merchandise location.

The recommended merchandise item may, in some embodiments, be identified by comparison of merchandise items in the shopping database to online shopping data, such as a history or a wish list associated with an online shopping database. Thus, in one scenario, a user of the shopping client device may elect to receive in-person purchase recommendations based on the user's online shopping history. In some embodiments, online shopping data may be obtained from an online shopping database 116 or a social network database 118. For example, a shopper's friend may provide gift ideas via social network database 118 so that the in-person shopper may find gifts for the friend that the friend will like.

Additionally or alternatively, in some embodiments, the recommended merchandise item may represent a merchandise item automatically identified and recommended to a user based on correlations between the requested merchandise item and the recommended merchandise item formed from aggregated information collected by the shopping efficiency system. For example, in a first scenario, the shopping server system may determine that a sale of a DVD player correlates with a sale of a DVD movie from the inventory information included in the shopping database. In a second scenario, the shopping server system may determine that a visit to location 114A or 114C, where DVD players are sold, correlates with a visit to location 114B or 114D, where DVD movies are sold. Thus, in an example where a DVD player is requested, a DVD movie may be recommended, and a list of possible merchandise locations having DVD movies may be identified.

In some embodiments, the shopping server system may be configured to identify one or more recommended merchandise items based on a comparison of the current location of the shopping client device to locations for the recommended merchandise items. For example, the shopping server system may recommend a DVD movie about World War II at location 114D to a user at current location 128 based on the user's online purchases of a number of books about World War II and based on the user's proximity to location 114D.

Continuing with FIG. 2, method 200 includes, at 218 calculating an efficient travel route including a stop at the first requested merchandise location using the facility and inventory information within the shopping database, and, at 224, sending the efficient travel route to the shopping client device for display on the shopping client device. Calculation of the efficient travel route may be performed, in some embodiments, by one or more algorithms configured to build route permutations between the merchandise locations for each of the requested merchandise items. For example, FIG. 4 shows three potential travel routes, Route A, Route B, and Route C, to locations having a requested DVD movie. Each potential travel route originates at current location 128 and extends to a merchandise location having the requested title. Further, in some embodiments, each potential travel route may have facility and inventory information corresponding to the merchandise location and/or the requested merchandise item associated therewith. For example, Route A may include path information for the travel route, customer in-line waiting times for a check stand of location 114B, and price information for the title at location 114B associated with the travel route.

Thus, in some embodiments, step 218 may include, at 220, using the route efficiency selection criterion as a key for filtering the facility and inventory information, wherein the efficient travel route is advantageously distinct relative to other potential travel routes in consideration of the route efficiency selection criterion.

For example, in a first scenario, a shopper in a hurry may want the efficient travel route to prioritize on a time basis. In this scenario, the route efficiency selection criterion may include a time parameter as a selection parameter. Further, the route efficiency selection criterion may comprise an instruction to filter potential travel routes according to a calculation of a time to obtain the requested merchandise item, wherein a potential travel route having a shorter total time may be prioritized over a potential travel route having a longer total time. Thus, in the example shown in FIG. 4, a requested DVD movie is available at locations 114B, 114C and 114D. Based on the facility information stored in shopping database 106, it is calculated that Route A is a 10-minute walk from current location 128, that Route B is a 2-minute walk from current location 128, and that Route C is a 5-minute walk from current location 128. Thus, Route B may be prioritized over Route C, and Route C may be prioritized over a Route A.

Figure 5:
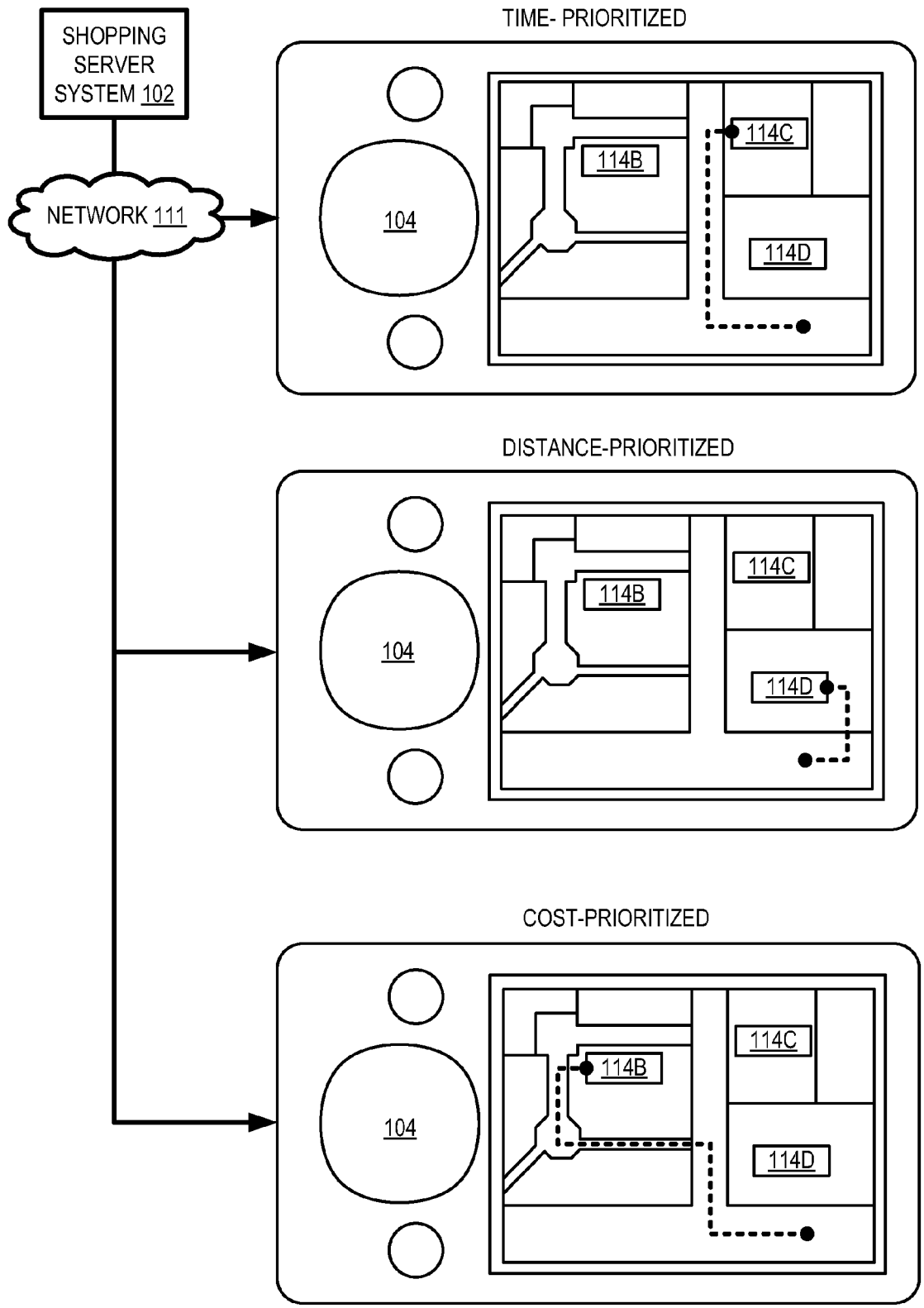
FIG. 5 schematically shows aspects of an example shopping efficiency system.

Further, in some embodiments, estimates of customer in-line wait times for a plurality of possible merchandise locations having the requested merchandise item may be included in the calculation of the time to obtain requested merchandise item. Thus, continuing with the example shown in FIG. 4, the 5-minute customer in-line wait at location 114B and the 15-minute customer in-line wait at location 114D may be included in the calculation of the overall route time for each potential travel route. Accordingly, Route C may be prioritized over Route A, and Route A may be prioritized over Route B. Thus, in this scenario, Route C may be sent to the shopping client device for display, such as shown in FIG. 5 as the "time-prioritized" display.

In a second scenario, a shopper on a budget may want the efficient travel route to prioritize on a cost basis. In this scenario, the route efficiency selection criterion may include a cost parameter and may comprise an instruction to filter potential travel routes according to a calculation of a cost of requested merchandise item, which may be derived from the inventory information stored in the shopping database. Thus, a potential travel route including a stop at a merchandise location where the requested merchandise item has a lower cost may be prioritized over a potential travel route including a stop at a merchandise location where the requested merchandise item has a higher cost. For example, consider a scenario, like that shown in FIG. 4, where a requested DVD movie is available at locations 114B, 114C, and 114D. If the DVD movie is more expensive at location 114C than at location 114D or 114B, Route A, which is a potential travel route including a stop at location 114B, may be prioritized over Route C or Route D. Thus, in this scenario, Route A may be sent to the shopping client device for display, such as shown in FIG. 5 as the "cost-prioritized" display.

In a third scenario, a shopper may want to reduce a distance traveled while shopping. In this scenario, the route efficiency selection criterion may comprise an instruction to filter potential travel routes according to a distance of each potential travel route, wherein a shorter potential travel route may be prioritized over a longer potential travel route. For example, consider a scenario, like that shown in FIG. 4, where a requested DVD movie is available at locations 114B, 114C, and 114D. Route A, originating at current location 128 and including a stop at location 114B, is depicted as a longer potential travel route than Route B, originating at current location 128 and including a stop at location 114D. Thus, route B may be prioritized over route A in this scenario, and Route B may be sent to the shopping client device for display, such as shown in FIG. 5 as the "distance-prioritized" display.

It will be appreciated that, in some embodiments, potential travel routes may be configured to include various geographic points-of-interest determined from the facility information of the shopping database.

In some embodiments, audible signals, cues, or speech may be associated with one or more stops, path segments, or points-of-interest of the potential travel routes and/or the efficient travel route so that a visual display of the efficient travel route may be supplemented with audio information. Additionally or alternatively, in some embodiments, such audio elements may be triggered based on dynamically updated location information for the shopping client device. For example, in one scenario, if a first requested merchandise item is located at location 114B and if Route A represents the efficient travel route, turn-by-turn audio instructions for Route A may be played by the shopping client device as the shopper traverses Route A. Thus, in this scenario, an audio instruction for the shopper to "proceed to the intersection" may be followed by an audio instruction to "turn right at the intersection" upon arrival at the intersection as detected by geolocation architecture of the shopping client device.

Furthermore, in some embodiments, potential travel routes may include two or more recommended merchandise locations. For example, if a first requested merchandise item is located at location 114A and location 114B, and a second requested merchandise item is located at location 114C and location 114D, then the following travel routes include stops that allow a shopper to purchase both the first and second requested merchandise items: 1) 128-114A-114C-128; 2) 128-114C-114A-128; 3) 128-114A-114D-128; 4) 128-114D-114A-128; 5) 128-114B-114C-128; 6) 128-114C-114B-128; 7) 128-114B-114D-128; and 8) 128-114D-114B-128. The travel route that is most aligned with a chosen route selection efficiency criterion may be sent to the shopping client device for display.

Continuing with FIG. 2, in some embodiments, step 218 may include, at step 222, including in the efficient travel route a stop at one or more recommended merchandise locations. For example, in one scenario, the potential travel routes may include suggested stops at one or more recommended merchandise locations for the same recommended merchandise item located along each potential travel route. In another scenario, a suggested stop at a recommended merchandise location on a first potential travel route may be for a recommended merchandise item that is different from the recommended merchandise item with a suggested stop located on a second potential travel route. For example, if the shopping database determines that the user may enjoy a snack with the DVD movie, Route A may include a suggested stop at a first recommended merchant location while Route B may include a suggested stop at a second recommended merchant location. Such selections may be made based on the proximity of a potential recommended merchandise location to a route between requested merchandise locations, for example.

In some embodiments, the efficient travel route may include a location of an empty parking stall in a vicinity of the current location of the shopping client device. For example, in one scenario, as the shopper approaches a merchandise location in a car, the shopping server system may update the efficient travel route to include the location of an empty parking stall nearest to the current location based on parking information of the shopping database, and may further update the efficient travel route as parking stalls become available or occupied.

Calculation of the potential travel routes and determination of the efficient travel route may be by any suitable algorithm. In some embodiments, the algorithm may include a linear or a non-linear programming objective function, a heuristic objective function derived from aggregated data obtained by the shopping efficiency system, etc. Further, it will be understood that in some embodiments, calculation of potential travel routes may be performed adaptively to respond to real-time changes in retail conditions at various participating merchants.

In some embodiments, a weighting factor for scaling a relative calculation importance of each of the plurality of selection parameters may be assigned to each of the plurality of selection factors. Thus, in one scenario, a budget- and time-conscious shopper may specify that potential travel route is to be prioritized on a cost basis first and on a time basis second. Accordingly, a larger weighting factor may be applied to a cost function of the route calculation and a smaller weighting factor may be applied to a time function of the route calculation. It will be appreciated that, in some examples, the algorithm may apply weighting factors for any suitable selection parameter. For example, weighting factors may be applied to calculate kid-friendly travel routes, disabled-friendly travel routes, etc.

In some embodiments, calculation of the efficient travel route may include an optimization routine configured to determine, for example, a shortest travel route having the smallest distance travelled; a cheapest travel route having stops at selected requested merchandise locations having the lowest cost requested merchandise items; a fasted travel route having the lowest customer in-line wait times, etc. Thus, in one scenario, a shopper pressed for time to purchase gifts for family members may input desired book and movie titles into shopping client device 104 for purchase on a visit to neighborhood 108. Because the shopper is in a hurry, the shopper may select a "fastest route" option. Shopping server system 102 identifies possible requested merchandise locations for each of the titles and generates potential travel routes to those locations based on shopping database 106. Calculation of a fastest travel route may be based on one or more weighting factors and based on customer in-line wait times for each of the possible requested merchandise locations. The shopping server system 102 then sends the fastest travel route, including stops at the selected merchandise locations for each title to shopping client device 104 for display.

In some embodiments, the above described methods and processes may be tied to a computing system. As an example, FIG. 6 schematically shows an embodiment of a shopping efficiency system that may perform one or more of the above described methods and processes. The shopping efficiency system includes shopping server system 102 and shopping client device 104. Shopping server system 102 and shopping client device 104 are configured to communicate via network 111. Network 111 may be any suitable network for facilitating communications between shopping server system 102 and shopping client device 104. For example, in some embodiments, network 111 may comprise the Internet and shopping server system 102 and shopping client device 104 may use wired or wireless technology to communicate via the Internet. Network 111 may include additional and/or alternative public and/or private networks in some embodiments.

Shopping server system 102 includes a logic subsystem 314 and a data-holding subsystem 312. Shopping server system 102 may be configured as any suitable server computing device and may include various suitable application programming interfaces, web services, and or other mechanisms configured to facilitate the provisioning of the shopping database described above. Further, in some embodiments, the shopping server system may be a server in a network cloud environment.

Additionally or alternatively, in some embodiments, shopping server system 102 may be configured as an adaptive shopping server system. For example, the adaptive shopping server system may be configured, as described above in reference to FIG. 2, to receive updates from participating merchants and merchant locations continuously or at preset intervals.

Logic subsystem 314 of shopping server system 102 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 312 of shopping server system 102 may include one or more physical, non-transitory, devices configured to hold data and/or instructions executable by the logic subsystem to implement the herein described methods and processes. When such methods and processes are implemented, the state of data-holding subsystem 312 may be transformed (e.g., to hold different data). Data-holding subsystem 312 may include any suitable computer-readable removable media and/or built-in devices. Data-holding subsystem 312 may include optical memory devices, semiconductor memory devices, and/or magnetic memory devices, among others. Data-holding subsystem 312 may include devices with one or more of the following characteristics: volatile, nonvolatile, dynamic, static, read/write, read-only, random access, sequential access, location addressable, file addressable, and content addressable. In some embodiments, logic subsystem 314 and data-holding subsystem 312 may be integrated into one or more common devices, such as an application specific integrated circuit or a system on a chip.

Shopping client device 104 includes logic subsystem 318, data-holding subsystem 316, and display 320. Shopping client device 104 may be configured as any suitable client computing device. For example, in some embodiments, shopping client device 104 may be a mobile phone, a laptop computer, a personal digital assistant, etc. Further, in some embodiments, shopping client device 104 may include suitable geolocation architecture configured to provide a current location of shopping client device 104 to shopping server system 102. Logic subsystem 318 and data-holding subsystem 316 of shopping client device 104 may be configured in any way described above with reference to the logic and data-holding subsystems of shopping server system 102.

Shopping client device 104 is configured to include display 320. Display 320 may be used to present a visual representation of data held by data-holding subsystem 316 (e.g., a visual representation of an efficient travel route). As the herein described methods and processes change the data held by the data-holding subsystem, and thus transform the state of the data-holding subsystem, the state of display 320 may likewise be transformed to represent visually changes in the underlying data. Display 320 may include one or more display devices utilizing virtually any suitable type of technology. Such display devices may be combined with logic subsystem 318 and/or data-holding subsystem 316 in a shared enclosure, or such display devices may be peripheral display devices.

In some embodiments, shopping client device 104 may be configured to include suitable audio components that provide an audio capability for playing various audible signals, cues, and/or speech associated with one or more stops, path segments, points-of-interest, etc. of the efficient travel route.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An adaptive shopping server system configured to generate, for display on a shopping client device, an efficient travel route to a location of a user- requested merchandise item, the efficient travel route being advantageously distinct relative to other potential travel routes in consideration of a route efficiency selection criterion received from the shopping client device, the system comprising:
   a logic subsystem; and
   a data-holding subsystem holding instructions executable by the logic subsystem to:
      provision a shopping database with facility and inventory information for one or more merchandise locations;
      from the shopping client device, receive a request for a requested merchandise item;
      from the shopping client device, receive the route efficiency selection criterion;
      use the route efficiency selection criterion as a key for filtering the facility and inventory information, calculate an initial travel route originating at a current location of the shopping client device and including a stop at a selected requested merchandise location identified within the shopping database from one of a plurality of possible requested merchandise locations having the requested merchandise item;
      send the initial travel route to the shopping client device for display on the shopping client device;
      responsive to a real-time change in retail conditions, receive a report generated by a participating merchant that indicates updated retail conditions,
      generate an updated travel route to a different merchandise location at a different site for obtaining the requested merchandise item in view of the updated retail conditions; and
      send the updated travel route to the shopping client device for display on the shopping client device.

2. The system of claim 1, wherein the route efficiency selection criterion includes a plurality of selection parameters, the plurality of selection parameters comprising at least two of a time parameter, a distance parameter, or a cost parameter.

3. The system of claim 2, wherein a weighting factor for scaling a relative calculation importance of each of the plurality of selection parameters is assigned to each of the plurality of selection parameters.

4. The system of claim 1, wherein the route efficiency selection criterion comprises an instruction to filter the potential travel routes according to a cost of the requested merchandise item, wherein a potential travel route including a stop where the requested merchandise item has a lower cost is prioritized over a travel route including a stop where the requested merchandise item has a higher cost.

5. The system of claim 1, wherein the facility and inventory information includes an estimate of customer in-line wait times for one or more merchandise locations.

6. The system of claim 5, wherein the route efficiency selection criterion comprises an instruction to filter the potential travel routes according to a calculation of a time to obtain the requested merchandise item, wherein a potential travel route having a shorter total time is prioritized over a potential travel route having a longer total time, and wherein the estimates of customer in-line wait times at the plurality of possible requested merchandise locations having the requested merchandise item are included in the calculation of the time to obtain the requested merchandise item.

7. The system of claim 1, wherein the facility and inventory information includes path information for paths connecting merchandise locations.

8. The system of claim 7, wherein the route efficiency selection criterion comprises an instruction to filter the potential travel routes according to a distance of each potential travel route, wherein a shorter potential travel route is prioritized over a longer potential travel route.

9. The system of claim 1, wherein the efficient travel route includes a location of an empty parking stall nearest to a current location of the shopping client device.

10. The system of claim 1, wherein the instructions are further executable to:
   receive a current location of the shopping client device from the shopping client device;
   identify within the shopping database a recommended merchandise location for a recommended merchandise item; and
   include in the efficient travel route a stop at the recommended merchandise location.

11. At a shopping server system, a method for generating an efficient travel route, for display on a shopping client device, between locations of merchandise items using facility and inventory information included in a shopping database, the method comprising:
   provisioning the shopping database with the facility and inventory information for one or more merchandise locations at different sites;

from the shopping client device, receiving a request for a first requested merchandise item;

from the shopping client device, receiving a request for a second requested merchandise item;

identifying within the shopping database a first requested merchandise location for the first requested merchandise item;

identifying within the shopping database a second requested merchandise location for the second requested merchandise item;

calculating an initial efficient travel route including a stop at the first requested merchandise location and a stop at the second requested merchandise location using the facility and inventory information within the shopping database, by:

receiving a route efficiency selection criterion from the shopping client device, the route efficiency selection criterion including a plurality of selection parameters, and assigning a weighting factor for scaling a relative calculation importance of each of the selection parameters to each of the selection parameters, a larger weighting factor being assigned to a first selection parameter and a smaller weighting factor being assigned to a second selection parameter, wherein the first selection parameter is defined as relatively more important than the second selection parameter;

sending the initial efficient travel route to the shopping client device for display on the shopping client device;

receiving a real-time change in participating merchant's current inventory information, the participating merchant's current inventory information indicating the participating merchant's immediate inability to sell the first requested merchandise item at the first requested merchandise location;

generating an updated efficient travel route, the updated efficient travel route foregoing a stop at the site of the first requested merchandise location and being comparatively more efficient than the initial efficient travel route in view of the real-time change in participating merchant's current inventory information; and sending the updated efficient travel route to the shopping client device for display on the shopping client device.

12. The method of claim 11, further comprising:

when calculating the initial efficient travel route, using the route efficiency selection criterion as a key for filtering the facility and inventory information, wherein the initial efficient travel route is advantageously distinct relative to other potential travel routes in consideration of the route efficiency selection criterion.

13. The method of claim 12, wherein the plurality of selection parameters comprises at least two of a time parameter, a distance parameter, or a cost parameter.

14. The method of claim 13, further comprising:

receiving a current location of the shopping client device from the shopping client device;

identifying within the shopping database a recommended merchandise location for a recommended merchandise item; and including in the initial efficient travel route a stop at the recommended merchandise location.

15. An adaptive shopping server system configured to generate, for display on a shopping client device, an efficient travel route to a location of a recommended merchandise item, the efficient travel route being advantageously distinct relative to other potential travel routes in consideration of a route efficiency selection criterion received from the shopping client device, the system comprising:

a logic subsystem; and a data-holding subsystem holding instructions executable by the logic subsystem to:

provision a shopping database with facility and inventory information for one or more merchandise locations;

receive a current location of the shopping client device from the shopping client device;

identify within the shopping database a recommended merchandise location for the recommended merchandise item;

from the shopping client device, receive a request for the recommended merchandise item;

from the shopping client device, receive a request for the recommended merchandise item;

from the shopping client device, receive the route efficiency selection criterion;

using the route efficiency selection criterion as a key for filtering the facility and inventory information, calculate an initial efficient travel route originating at the current location of the shopping client device and including a stop at the recommended merchandise location identified within the shopping database from one of a plurality of possible merchandise locations having the recommended merchandise item by executing instructions to:

receive a route efficiency selection criterion from the shopping client device, the route efficiency selection criterion including a plurality of selection parameters, and assign a weighting factor for scaling a relative calculation importance of each of the selection parameters to each of the selection parameters, a larger weighting factor being assigned to a first selection parameter and a smaller weighting factor being assigned to a second selection parameter, wherein the first selection parameter is defined as relatively more important than the second selection parameter;

send the initial efficient travel route to the shopping client device for display on the shopping client device;

responsive to a real-time change in a participating merchant's current inventory information, receive a report generated by a participating merchant that indicates the participating merchant's immediate inability to sell the requested merchandise item at the requested merchandise location;

generate an updated efficient travel route to a different merchandise location at a different site for obtaining the requested merchandise item, the updated efficient travel route being comparatively more efficient than the initial travel route in view of the real-time change in-the participating merchant's current inventory information; and send the updated efficient travel route to the shopping client device for display on the shopping client device.

16. The system of claim 15, wherein the plurality of selection parameters comprises at least two of a time parameter, a distance parameter, or a cost parameter.

17. The system of claim 15, wherein the recommended merchandise item is identified by comparison of merchandise items in the shopping database to online shopping data for a user of the shopping client device.

18. The system of claim 15, wherein the efficient travel route includes a location of an empty parking stall nearest to the current location of the shopping client device.

19. The system of claim 1, wherein the updated travel route is configured to trigger an audible presentation of the updated travel route at the shopping client device.

20. The system of claim 15, wherein the updated efficient travel route is configured to trigger an audible presentation of the updated travel route at the shopping client device.

* * * * *

UNITED STATES PATENT AND TRADEMARK OFFICE
CERTIFICATE OF CORRECTION

PATENT NO.         : 8,150,741 B2                              Page 1 of 1
APPLICATION NO.    : 12/724336
DATED              : April 3, 2012
INVENTOR(S)        : Figueroa et al.

It is certified that error appears in the above-identified patent and that said Letters Patent is hereby corrected as shown below:

In column 14, lines 14-17, in Claim 15, delete "from the shopping client device, receive a request for the recommended merchandise item; from the shopping client device, receive a request for the recommended merchandise item;" and insert -- from the shopping client device, receive a request for the recommended merchandise item;" --, therefor.

Signed and Sealed this
Ninth Day of October, 2012

David J. Kappos
*Director of the United States Patent and Trademark Office*